United States Patent [19]
Fahey

[11] 4,110,737
[45] Aug. 29, 1978

[54] CHARACTER RECOGNITION APPARATUS FOR SERIALLY COMPARING AN UNKNOWN CHARACTER WITH A PLURALITY OF REFERENCE CHARACTERS

[75] Inventor: William David Fahey, Cupertino, Calif.

[73] Assignee: The Singer Company, Binghamton, N.Y.

[21] Appl. No.: 826,588

[22] Filed: Aug. 22, 1977

[51] Int. Cl.² ............................................. G06K 9/12
[52] U.S. Cl. .......................... 340/146.3 Q; 340/146.2
[58] Field of Search .............. 340/146.3 Q, 146.3 AQ, 340/146.3 MA, 146.2; 364/728, 819; 343/5 MM

[56] References Cited

U.S. PATENT DOCUMENTS

| | | | |
|---|---|---|---|
| 3,643,215 | 2/1972 | Ingham et al. | 340/146.3 AH |
| 3,909,785 | 9/1975 | Howells | 340/146.3 SY |
| 3,930,229 | 12/1975 | Crane et al. | 340/146.3 SY |
| 4,030,068 | 6/1977 | Banz | 340/146.3 MA |

Primary Examiner—Leo H. Boudreau

Attorney, Agent, or Firm—Paul Hentzel; Jeffrey Rothenberg

[57] ABSTRACT

A character recognition apparatus for recognizing an unknown character having a value at a matrix of discrete locations, comprising a ROM having at least a first plurality of storage locations each containing an address storing location and a reference storing location and storing information relative to a reference character, the ROM responding to a count signal and providing a first address signal and a reference signal, a RAM including a second greater plurality of storage locations each storing a value of the unknown character at a discrete matrix location, the RAM being responsive to the first address signal and providing a data signal corresponding to the value of the unknown character at the address location, a counter and a comparator circuit responding to the data signal and the reference signal and producing an output signal that serves as an indication that the unknown character is not the reference character.

In the preferred embodiment, two ROMs and two RAMs are employed to enhance the speed of the apparatus.

15 Claims, 5 Drawing Figures

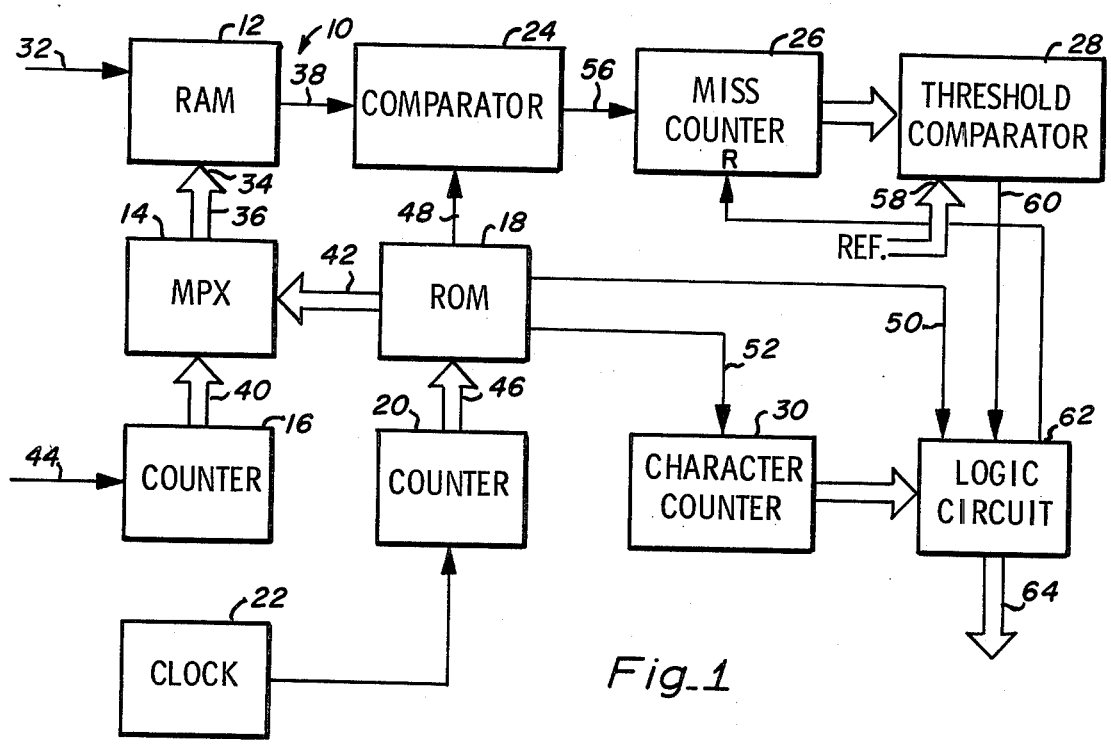
Fig_1
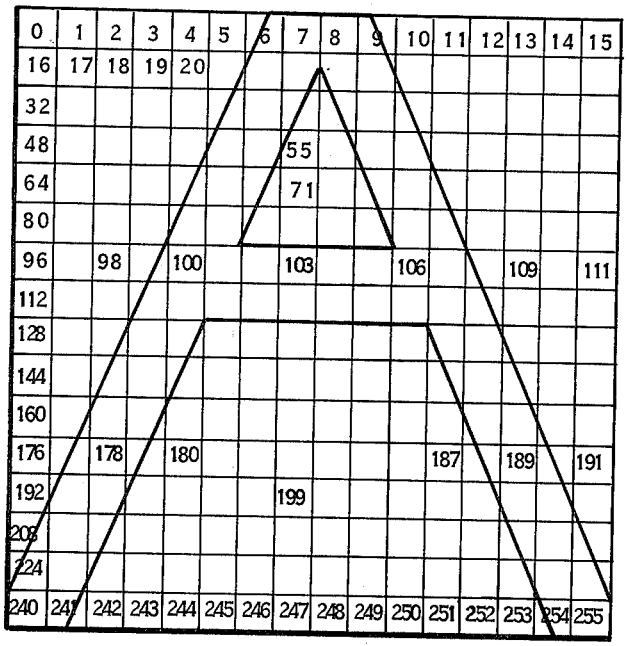
Fig_2
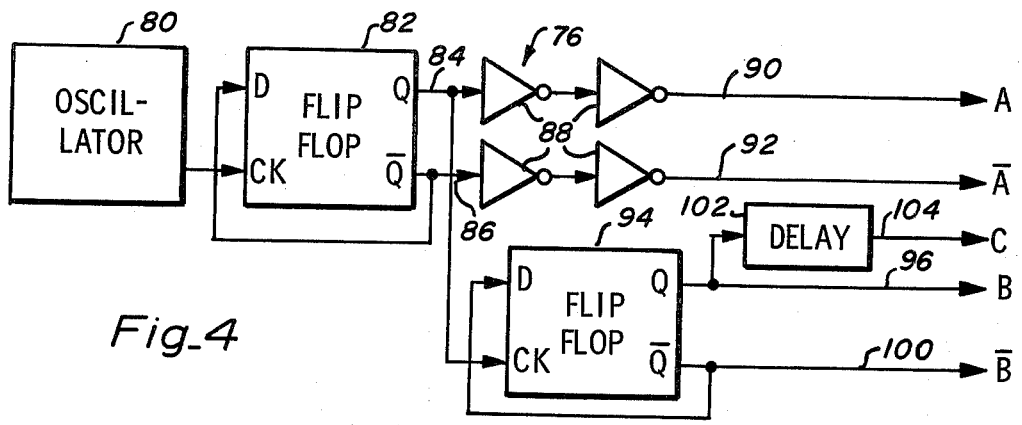
Fig_4

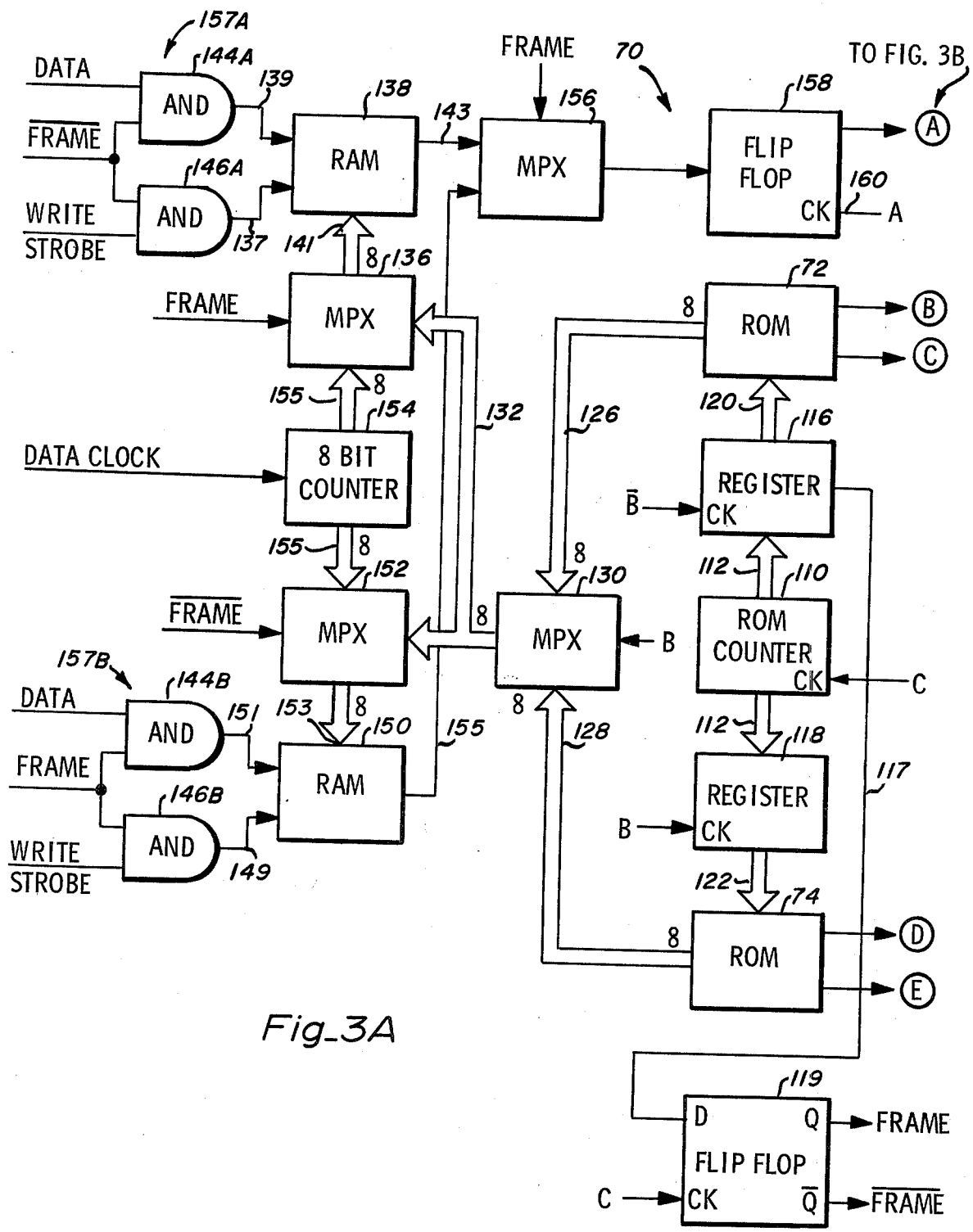
Fig_3A

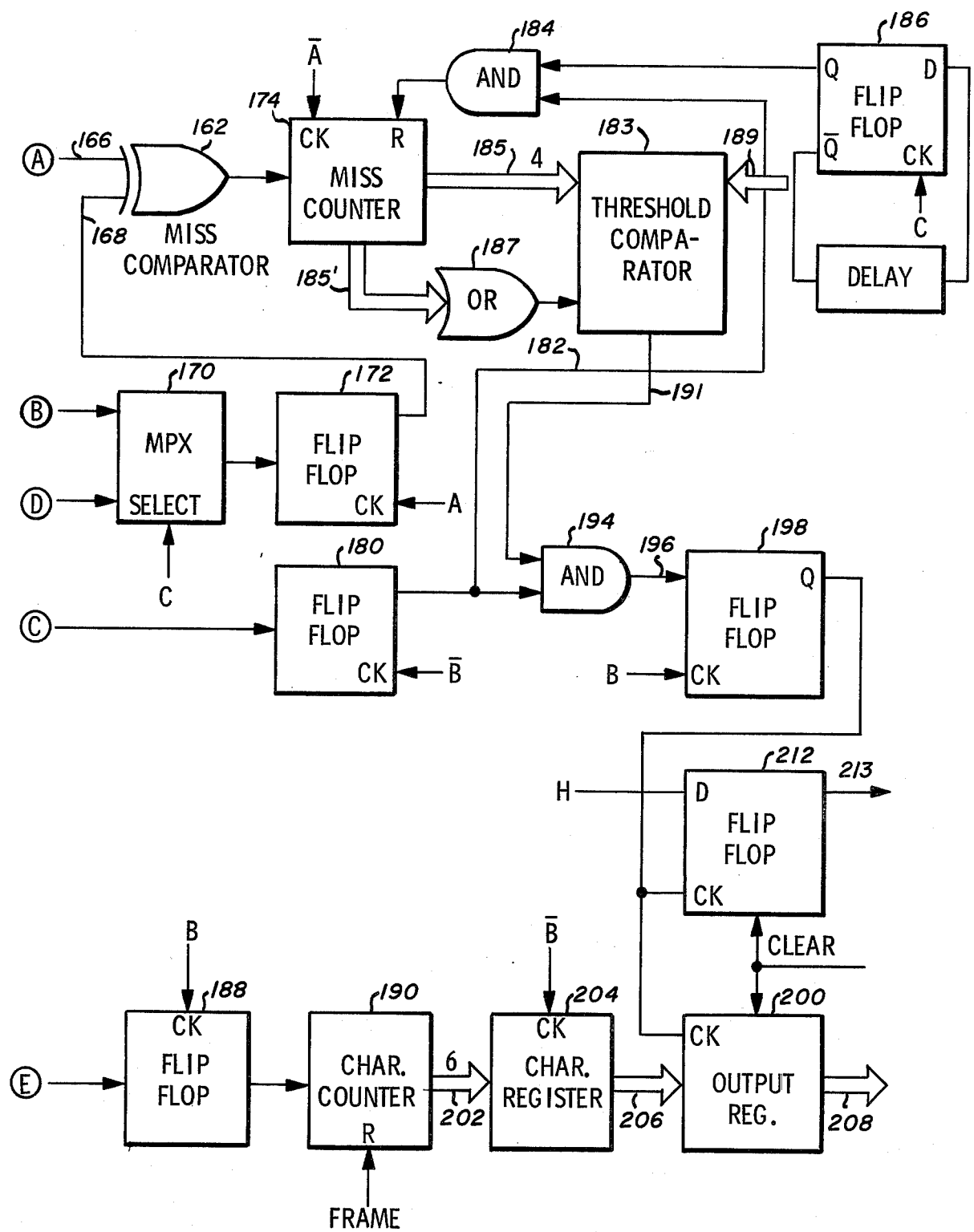
Fig_3B

CHARACTER RECOGNITION APPARATUS FOR SERIALLY COMPARING AN UNKNOWN CHARACTER WITH A PLURALITY OF REFERENCE CHARACTERS

BACKGROUND OF THE INVENTION

1. Field of the Invention

The present invention relates generally to apparatus for recognizing graphic data, and more particularly to a character recognition apparatus that recognizes characters by comparing data representative of an unknown character and stored data representative of selected characters in a serial manner.

2. Description of the Prior Art

Heretofore, devices have been available for recognizing graphic data such as characters, letters, numerals, marks, symbols, fingerprints, etc. Such devices are used as label readers, as feeders for computing machines, as comparators for checking the similarity between thumb prints, and as card readers to prevent unauthorized access to industrial plants or military installations.

One type of prior art device for recognizing characters uses analog components to compare a train of electrical pulses derived from scanning an unknown character with various trains of pulses derived from information stored on a magnetic drum memory, each of which is representative of a different known or reference character. The comparison between the unknown character and all the known characters occurs in a parallel manner. Those pulses of each known train which are coincident in time with pulses of the unknown train are ignored, and those pulses which are not coincident in time are counted. The number of pulses counted provides an indication of the differences between the unknown character being examined and the reference character with which it is compared. In this manner the unknown symbol is identified by a process of elimination, or rejection of all known characters which differ. However, such a device has been found to be undesirable since it operates on an analog video signal and consequently requires many relatively complex video comparators and amplifiers because of the simultaneous parallel comparisons. Another disadvantage of such a device is that the magnetic drum memory that is required to store the complex video signals is relatively large and consequently expensive.

Examples of such prior art devices are found in U.S. Pat. Nos. 3,713,099 and 3,713,100, each of which is entitled "Method and Apparatus for Identifying Letters, Characters, Symbols and the Like" by Harold S. Hemstreet.

SUMMARY OF THE PRESENT INVENTION

It is therefore an object of the present invention to provide an improved character recognition apparatus which is able to serially compare an unknown character with a plurality of selected characters.

Another object of the present invention is to provide a character recognition apparatus which is capable of serially comparing the unknown character at a rate fast enough to handle the unknown characters in a continuous manner.

Still another object of the present invention is to provide a low-cost character recognition apparatus utilizing a peephole matching algorithm that employs conventional digital integrated circuits rather than the relatively complex analog components.

Yet another object of the present invention is to provide a character recognition apparatus which utilizes only selected portions of a scanned video signal and accordingly requires reduced memory storage while producing increased recognition speed.

Yet another object of the present invention is to provide a character recognition apparatus which is able to tolerate misregistration in the horizontal alignment of the scanned character.

Briefly, an embodiment comprises a ROM having at least a first plurality of storage locations each containing an address storing location and a reference storing location and storing information relative to a reference character, the ROM responding to a count signal and providing a first address signal and a reference signal, a RAM including a second plurality of storage locations each storing a value of an unknown character at a discrete matrix location, the second plurality being greater than the first plurality of storage locations, the RAM being responsive to the first address signal and operative to provide a data signal corresponding to the value of the unknown character at the address location, a counter for applying the count signal and a comparator circuit that is responsive to the data signal and the reference signal and being operative to provide an output signal when such signals are unlike, the output signal serving as an indication that the unknown character is not the reference character.

In the preferred embodiment, two ROMs and two RAMs are employed to enhance the speed of the apparatus.

An advantage of the present invention is that it provides a simple, reliable character recognition apparatus which is able to serially compare an unknown character with a plurality of selected characters.

Another advantage of the present invention is that it provides such serial comparison at a rate fast enough to handle unknown characters in a continuous manner.

Still another advantage of the present invention is that it utilizes relatively inexpensive digital integrated circuits.

Yet another advantage of the present invention is that it provides a relatively fast scheme for recognizing unknown characters without requiring large or complex memory devices.

Yet another advantage of the present invention is that it does not require horizontal registration of the unknown character and is able to tolerate angular misalignment between the scanning optical character recognition wand and the label that is being scanned.

Other objects and advantages of the present invention will no doubt become apparent to those skilled in the art after having read the following detailed description of the preferred embodiments which are illustrated in the several figures of the drawing.

IN THE DRAWING

FIG. 1 is a block diagram of a character recognition apparatus in accordance with the present invention;

FIG. 2 illustrates a scanning matrix having 256 elements superimposed over the letter A;

FIGS. 3A and 3B are a block diagram of a second embodiment of a character recognition apparatus in accordance with the present invention; and FIG. 4 is a block diagram of a timing generator for use with the apparatus illustrated in FIG. 3.

DETAILED DESCRIPTION OF THE PREFERRED EMBODIMENT

Referring now to FIG. 1 of the drawing, a character recognition apparatus 10 is shown in block diagram form in accordance with the present invention. The apparatus 10 comprises a random access memory (RAM) 12, a multiplexer (MPX) 14, a counter 16, a read only memory (ROM) 18, a counter 20, a clock 22, a comparator 24, a miss counter 26, a threshold comparator 28, a character counter 30, and a logic circuit 62.

The RAM 12 includes a data and write input 32, an address input 34 which is connected to a bus 36, and an output which is connected by a line 38 to an input of the comparator 24. The RAM 12 serves to store each of the bits of a stream of data supplied to its input 32 in a unique location at an appropriate address supplied to the input 34 corresponding to its position in the stream and also to the location of the element in the scan matrix and to retrieve the data bit and provide it at the output 20 when an appropriate address is supplied to the input 34. As will be subsequently described the data stream is representative of a character. The RAM 12 is preferably one having a storage capacity of 256 bits and serves to store a complete field representative of the character to be recognized.

Referring also to FIG. 2 the letter A is illustrated as a darkened character on a background white surface with a 256-element matrix superimposed thereover. The letter A is a character of the class which is capable of being recognized and in a manner well known in the art is presented to the apparatus in the form of a serial data stream. Typically, such a stream is derived by centering the character to be recognized within the field of view of an optical character recognition wand that is designed to scan the viewing field line by line. This produces a matrix of image elements having a value at each location that corresponds to whether a portion of the character or the background is scanned.

Accordingly, as the image elements in the zero through five locations of the top line are scanned, only the white background is sensed, and the data stream consists of a low or zero state. As the elements six through nine are scanned, the data stream comprises a high or 1 state since a darkened portion of the letter A is present. Similarly, as the elements 10 through 15 are scanned, the elements have a zero state.

For each of the characters of the class that are to be recognized it has been found that certain locations are considered critical in the recognition of such character. For example, it has been found that there are 18 locations of the matrix field for the letter A that are critical points. A table of the critical points follows:

TABLE I

| Letter A Without Misalignment | | |
|---|---|---|
| Memory Storage Location | Critical Point Location | Presence/Absence of Character at Location |
| 0 | 17 | 0 |
| 1 | 240 | 1 |
| 2 | 255 | 1 |
| 3 | 199 | 0 |
| 4 | 71 | 0 |
| 5 | 100 | 1 |
| 6 | 103 | 1 |
| 7 | 106 | 1 |
| 8 | 96 | 0 |
| 9 | 98 | 0 |
| 10 | 109 | 0 |
| 11 | 111 | 0 |
| 12 | 176 | 0 |

TABLE I-continued

| Letter A Without Misalignment | | |
|---|---|---|
| Memory Storage Location | Critical Point Location | Presence/Absence of Character at Location |
| 13 | 178 | 1 |
| 14 | 180 | 0 |
| 15 | 187 | 0 |
| 16 | 189 | 1 |
| 17 | 191 | 0 |

In the above table, the first column corresponds to the address at which each of the points is stored in memory. The second column represents a location of the critical point in the matrix field with reference to the matrix image addresses illustrated in FIG. 2. The third column indicates whether the data bit is in the high or the low state at such location and corresponds to the presence or absence of a portion of the character at the location. Accordingly, for the letter A, the first critical location is matrix element 17 (located near the upper left-hand corner of FIG. 2), such location being stored in memory location zero and having a low state in the data identifier bit field. Similarly, the second critical point is matrix element 240 which is located near the lower left-hand corner of the matrix, stored in memory location one and has a high state in the data identifier bit field.

With reference to FIG. 2, it can be seen that the letter A is vertically and horizontally aligned relative to the scanning matrix. However, in accordance with the present invention as long as the reference character is vertically aligned with the bottom or the top of the matrix, angular and horizontal misalignment can be tolerated. Because of the likelihood of angular misalignment between the wand and the character five separate matrices of critical points are determined. The first matrix includes critical points when angular misalignment is not present; the second and the third when there is a 5° misalignment in the clockwise and counterclockwise direction, respectively; and the fourth and fifth when there is a 10° misalignment in the clockwise and in the counterclockwise directions, respectively. Furthermore, the number of critical points for each character can vary, with the average length being about 20 words.

The multiplexer 14 is of the eight-bit type with bus lines 40 and 42 connected to its inputs and the bus 36 connected to its output. The multiplexer 14 serves to selectively apply signals applied to one of the input buses 40 and 42 to the output bus 36, and hence to the RAM 12.

The counter 16 includes an input count line 44 from previous circuitry and serves to count pulses which are developed on this line coincident with the data bits supplied on input 32 and provide a signal through bus 40 to the multiplexer 14 when the apparatus is operative in the storage mode.

The ROM 18 is a read only memory having a memory storage capacity of 2048 words, each word having 11 bits. It includes an input connected to an 11-bit bus 46, and outputs comprising an eight-bit bus 42 and output lines 48, 50 and 52. The ROM 18 stores data representative of blocks of words corresponding to 5 matrices of ciritical points for each of 20 characters. For example, the first block of words is allocated to the letter A which is aligned in the viewing field, the next block of words is allocated to the letter A rotated in the viewing field at an angle of 5° in a clockwise direction, etc. In each word, the first eight bits correspond to one of the critical locations, and hence as an address in RAM 12. The ninth bit corresponds to an indication of whether a portion of the character should be present or absent (a one or a zero) at that location. The 10th bit is normally zero but includes a one when the final memory location allocated to each block of words for each rotation of the character and is commonly referred to as the "end of fine encoding signal." The 11th bit includes a one when the last memory location for a character occurs, and is generally referred to as the "end of character signal."

The bus 42 serves to carry address information to RAM 12, the output line 48 to provide a reference signal to the comparator 24, the output line 50 to provide an indication of the end of character fine encoding, and the output line 52 to provide an indication of the end of character.

The clock 22 is connected to the 11-bit counter 20 and provides clock pulses to advance the counter from 0 to 2047. This serves to sequentially address each word in ROM 18.

The comparator 24 is an exclusive OR gate and includes input lines 38 and 48 and an output line 56. The comparator provides a signal on output 56 when the signals applied on lines 38 and 48 are not the same. Accordingly, when the bit corresponding to the element of the character to be recognized at a particular critical location does not correspond with the state of the bit of the reference character stored in ROM 18 the comparator 24 provides an output which is indicative of a miss.

The miss counter 26 has an input terminal connected to line 56 and a reset terminal R and serves to count the number of missess produced by the comparator 24.

The threshold comparator 28 includes a reference bus 58, inputs connected to the miss counter 26 and an output 60 and serves to provide a signal on output 60 when the number of misses exceeds a predetermined threshold. This indicates that the unknown character is not the character which it is being compared against.

The character counter 30 serves to count the number of end of character signals appearing on line 52. As previously described, such a signal is generated each time ROM 18 is sequenced through the several matrices associated with each character. The count registered by the counter 30 corresponds to the character presently being used for comparison.

Logic circuitry generally designated by the numeral 62 is coupled to the output 60, to the line 50 and to the character counter 30. The circuitry is comprised of those components necessary to provide a reset pulse to the reset terminal R of the miss counter 26 and also to monitor the outputs of the character counter 30, and the lines 50 and 60. The circuit 62 responds to the presence of the end of fine encoding signal on line 50. At that time, if the output of the threshold comparator 28 is low, it determines the identity of the reference character based on the count in character counter 30. An indication of the recognized character is produced at output 64. After the state of the signal appearing on line 60 is determined, the circuit 62 applies a reset pulse to the miss counter 26.

In operation with the apparatus 10 in the storage mode, a stream of data derived from the character being scanned is formated as a matrix 16 elements wide 16 elements long. This data is written into the RAM 12 at the data and write inputs 32. Pulses on line 44 coincident with each data bit are input to the counter 16 which counts the pulses and provides the sum of the counts through bus 40 to multiplexer 14. The multiplexer 14 serves to connect the sum of the clock pulses through bus 36 to the address input 34 of the RAM 12. The RAM 12 stores each of the data bits in a location corresponding to the position of the data bit in the data stream and also to the location of the element in the scanned matrix.

In accordance with the peephole matching algorithm, the apparatus 10 is then switched to a character recognition mode in which counter 20, advanced by pulses from the clock 22, counts clock pulses from zero to 2047 and serves to sequentially address each word in the ROM 18. As each word is retrieved, the first eight bits are connected through bus 42, multiplexer 14 and bus 36 to the address input 34 of the RAM 12. In addition, the ninth bit is provided through line 48 to the comparator 24, the 10th bit is provided on output 50 as an indication of the end of character fine coding signal and the eleventh bit is provided on line 52 as the end of character signal.

With the application of the address from ROM 18, the RAM 12 provides an output on line 38 corresponding to the state of the image element that is stored at the particular critical test location. The exclusive OR gate comparator 24 responds to such output and the reference signal appearing on line 48, which is indicative of the presence or absence of the portion of the reference character at this location. When the bit representative of the image element of the character to be recognized does not correlate with the reference signal, the comparator 24 provides an output on line 56 which serves to register a count in the miss counter 26. The threshold comparator 28 monitors the counts in the miss counter and compares the number with the predetermined number into its reference input 58. When the misses exceed the reference count, the threshold comparator 28 produces a high output signal on output 60.

During the time that the data and reference bits are being compared for recognition purposes, the character counter 30 counts the number of end of character pulses appearing on line 52, the number of such pulses corresponding to the character being investigated. Also, the circuit 62 senses the presence of an end of character fine encoding signal on line 50 and monitors the output 60 of threshold comparator 28. When the end of fine encoding signal occurs and the output signal of the threshold comparator 28 is low, the circuit 62 responds to the number of counts in character counter 30 and provides an indication on output 64 of the identity of the character. Alternatively, the circuit can provide an indication when there is lack of correlation between the unknown and the reference characters. Upon application of each end of fine encoding signal, the circuit 62 resets the miss counter 26. Thereafter, counting and comparison continues until all the words stored in ROM 18 have been used. At that time the next unknown character to be recognized is loaded into the RAM 12.

It should be recognized that when the count in miss counter 26 exceeds the reference count, the apparatus can be adapted to immediately skip to the next reference character. Also, when the unknown character is recognized, the next unknown character can be loaded into the RAM.

In the preferred embodiment the devices comprising the character recognition apparatus are fabricated with 7400 series components using T²L logic.

Referring now to FIG. 3, an alternative embodiment of a character recognition apparatus 70 is illustrated. The fundamental difference between the apparatus 70 and the apparatus 10 illustrated in FIG. 1 is the inclusion of two ROMs 72 and 74 which are arranged in such a manner on a time multiplexing basis to approximately double the speed of the character recognition technique. In addition two RAMs 138 and 150 are employed to allow one unknown to be tested while another is being stored.

A pulse generator illustrated in FIG. 4, provides the necessary clocking, or strobing, signals for the apparatus 70. The generator 76 includes an oscillator 80 which provides an output signal having a frequency of 13.33 megacycles. A flip-flop 82 divides the frequency of the output signal in half and shapes the signal so as to provide complementary 6.66 megacycle signals on its outputs 84 and 86, respectively. Two inverters 88 are connected to the output 84 and provide on terminal 90 a reference signal designated by the letter A. The signal A is in the form of a pulse train which is in the high state for 75 nanoseconds and in the low state for 75 nanoseconds. Similarly, inverters 88 are coupled to the output 86 and provide on terminal 92 the complement of the signal appearing on 90 which is designated as $\overline{A}$. A flip-flop 94 is connected to the output 84 and serves to again divide the frequency of the signal in half so as to provide a pulse train having pulses which are high for 150 nanoseconds and low for 150 nanoseconds. The pulse appearing on output 96 is designated as signal $\overline{B}$ while its complement B appears on output 100. A delay line 102 connected to the output 96 provides a delayed signal C at terminal 104. The described reference signals A, $\overline{A}$, B, $\overline{B}$, and C serve to clock the devices comprising the apparatus 70 in a manner as will be hereinafter described.

With reference again to FIG. 3, ROM 72 and ROM 74 are identical in construction but not in contents, and serve to each store 1024 10-bit words consisting of reference character data. The first eight bits of each word correspond to one of the critical locations, and hence as an address in the RAMs. The ninth bit corresponds to an indication of whether a portion of the character should be present or absent (a one or a zero) at that location. The tenth bit in ROM 72 contains the end of character fine encoding information and the tenth bit in ROM 74 provides the end of character signal.

A ROM counter 110 is coupled by 10-bit bus 112 to registers 116 and 118. The counter 110 serves to count the number of C signals and to provide a signal corresponding to the sum of the counts to the registers 116 and 118. The registers 116 and 118 are clocked by the clock signals B and $\overline{B}$, respectively, and store the count signal present at that time. The stored signal is supplied on the 10-bit output buses 120 and 122 to address the ROMs 72 and 74. About 100 nanoseconds after the counter 110 is strobed with signal C, its output is valid. Register 116 is strobed with the rising edge of the $\overline{B}$ signal, and that driving the register 118 strobed with the rising edge of the B signal. The register 116 also serves to supply the 10th bit on line 117 to the data input of a flip-flop 119, which in turn develops the complementary FRAME and $\overline{FRAME}$ signals.

The address output is supplied by ROM 72 on bus 126 to the multiplexer 130. Similarly, the address output from ROM 74 is supplied on bus 128 to the multiplexer 130. The address signal on buses 126 and 128 become valid about 100 nanoseconds after the ROMs 72 and 74 are addressed and remain valid until the registers 116 and 118 provides a change of address. The multeplexer 130 is selected by the B signal and selectively connects the address information via the eight-bit bus 132 to the multiplexers 136 and 152. Multiplexer 136 is selected by the FRAME signal and connects the address signal on bus 132 through an eight-bit bus 141 to the RAM 138 at a time when RAM 138 has a frame of information stored therein. Multiplexer 152 is selected by the FRAME signal and connects the address signal on bus 132 through an eight-bit bus 153 to the RAM 150 when RAM 150 has a frame of information stored therein.

An eight-bit counter 154, similar to the counter 16 previously described, serves to count data clock pulses which are developed coincident with the data bits and provide an address signal through buses 155 to the multiplexers 136 and 152. The multiplexers 136 and 152 serve to connect the count signals to the RAMs 138 and 150 when the respective RAM is in the storage or write data mode.

The RAMs 138 and 150 are identical in construction to those previously described. The RAM 138 includes a write strobe 137, a data input 139, an address input 141 which is connected to a bus, and an output which is connected by a line 143 to an input of a multiplexer 156. Similarly, the RAM 150 includes a write strobe 149, a data input 151, an address input 153 and an output connected by line 155 to the multiplexer 156. The RAMs serve to store each of the bits of a stream of data supplied to its input in a unique location at an appropriate address supplied to its address input corresponding to its position in the stream and also to the location of the element in the scan matrix and to retrieve the data bit and provide it at the output when an appropriate address is supplied to the address input. The RAMs each have a storage capacity of 256 bits and serve to store a complete field representative of the character to be recognized.

In order to supply the frames of information to each of the RAMs, input circuits 157A and 157B are employed. Each input circuit includes two AND gates 144A and 146A and 144B and 146B. The AND gates 144A and 144B have inputs which are adapted to receive input data and FRAME/$\overline{FRAME}$ signals, and the AND gates 146A and 146B are adapted to receive write strobe and FRAME/$\overline{FRAME}$ signals. The gates are configured to alternatively store successive frames of unknown character data in the RAMs 138 and 150.

In operation, the input data stream representative of the unknown character data in RAM 138 is provided by the input circuit 157A. At the occurrence of the next FRAME signal the next unknown character is loaded into RAM 150 and the counter 154 is connected to RAM 150 by the multiplexer 152. Counter 154 provides the sum of the counts to the address input 153 of the RAM 150. The RAM 150 stores each of the data bits in a location corresponding to the position of the data bit in the data stream and also to the location of the element in the scanned matrix. Simultaneously, the apparatus 70 is proceeding to identify the character previously stored in RAM 138 in accordance with the address provided to the input 141.

In order to address the RAM 138, the following sequence of events occur. When signal C occurs ROM counter 110 is updated. After its output is valid signal $\overline{B}$ occurs which loads the count into register 116. Simultaneously, the count in register 116 addresses ROM 72. After register 116 becomes valid, ROM 72 later becomes valid. Thereafter, the output of ROM 72 is connected via MPX 130, bus 132 and MPX 136 to address input 141. At the time ROM 72 is connected to MPX 130, register 118 stores the count and when its output is valid supplies the same address to ROM 74. After the output of ROM 74 is valid and the clock pulse C occurs, the counter 110 is updated. When signal $\overline{B}$ occurs, the MPX 130 connects the address data on bus 128 from ROM 74 to address 141 via bus 132. This alternatively applies the address data stored in ROMs 72 and 74 to the address of RAM 138.

When the RAM 138 is addressed, the information stored in the address location is supplied through the multiplexer 156 to the storage flip-flop 158. The flip-flop is strobed by the signal A applied at its clock input 160 which enables the stored data bit to be transferred to the input 166 of the miss comparator 162. It should be recognized that after the stored data is transferred to the flip-flop 158, the address applied to the RAM 138 can be changed.

The miss comparator 162 is similar to that previously described and comprises an exclusive OR gate which provides a high output signal when the signal applied to its inputs 166 and 168 are different.

When the data bit of the unknown character is stored in the flip-flop 158, the ninth bit representative of the critical point data from ROM 72 is valid at the output of multiplexer 170. The occurrence of the C signal has selected the ninth bit from ROM 72 to be transferred to the input of flip-flop 172. Thereafter, when the A signal clocks the flip-flop 172, the bit is provided at the input 168 so as to be in time coincidence with the data bit of the unknown character when the data appearing at the inputs 166 and 168 are the same, the miss comparator 162 does not change state. However, should the bits not correlate, the miss comparator 162 provides an output level which enables the miss counter 174.

A miss counter 174 having clock and reset inputs and a four-bit bus outputs 185 and 185' is coupled to the output of the miss comparator 162. The miss counter serves to count the number of misses provided by the comparator 162.

A threshold comparator includes a reference bus 189, inputs connected to the bus 185 and to the bus 185' through an OR gate 187, and an output 191 and serves to provide a signal on output 191 when the number of misses exceeds a predetermined threshold. This indicates that the unknown character is not the character which it is being compared against. An AND gate 194 includes the input 191 and an input connected to a storage flip-flop 180. The flip-flop 180 includes an input connected to the ROM 72 and a clock input. The ROM 72 serves to supply the tenth bit representative of the end of character fine encoding provided to the flip-flop 180. The flip-flop 180 is strobed with the signal $\overline{B}$ and provides a high output when $\overline{B}$ goes high and an end of character fine encoding is encountered. The output is applied to the AND gate 194 and also via conductor 182 and AND gate 184 and provides a reset pulse to the miss counter 174.

With the application of simultaneous high levels from the threshold comparator 183 and the flip-flop 180, the AND gate 194 conducts a high level to its output 196 which is indicative that a character has been recognized. This level is applied to the input of flip-flop 198. Upon the occurrence of the B signal, the flip-flop 198 stores this level and clocks the output register 200.

A flip-flop 188 is coupled to the output of ROM 74. The ROM 74 serves to supply the 10th bit representative of the end of character of the words stored in ROMs 72 and 74 to the flip-flop 188 which provides an output to a character counter 190 upon the occurrence of the B signal. The character counter 190 serves to count the end of characters encountered and provides an output number representing the character being processed.

Upon the occurrence of a $\overline{B}$ signal, the signal stored in the character counter 190 output is transferred via a six-bit bus 202 to a character register 204. The stored end of character signal provides on bus 206, and hence at the output register 200, an indication of what character is being examined at the time. The occurrence of the signal from flip-flop 198 at the clock terminal of the output register 200 causes the output register to provide an indication on bus 208 of the character that is recognized by the apparatus 70.

In addition, the output of the flip-flop 198 is applied to appropriate flip-flop circuitry 212 to provide a signal on the output 213 of 212 indicating a character has been recognized and that the following circuitry should read bus 208 of output register 200 since it provides a number indication of the recognized character.

Also, upon generation of a $\overline{\text{FRAME}}$ pulse, the multiplexer 152 is connected to apply the address from the counter 154 to the RAM 150 while the previously stored frame of information stored in the RAM 138, is processed.

It should be noted that different thresholds are capable of being set in the threshold comparator 183 via bus 189. This enables higher and or lower thresholds to be set for the particular label or label types being scanned.

Also, if the miss counter 174 exceeds the threshold level of the comparator 183 the apparatus 70 can be modified so that it is not necessary to continue testing of the character stored in the apparatus. The apparatus can then be advanced to skip to the next character that is stored.

It should be noted that the character recognition apparatus employing a peephole matching algorithm can be used to identify any type of character, symbol, or the like, which can be converted into a series of electrical impulses for which a reference character can be stored in memory. The character may comprise a series of stripes or the like.

While the invention has been particularly shown and described with reference to certain preferred embodiments, it will be understood by those skilled in the art that there are alterations and modifications in form and detail may be made therein. Accordingly, it is intended that the following claims cover all such alterations and modifications as fall within the true spirit and scope of the invention.

What is claimed is:

1. A character recognition apparatus for recognizing an unknown character having a value at a matrix of discrete locations, said apparatus comprising:

first memory means having at least a first plurality of storage locations each containing an address storing location and a reference storing location and storing information relative to a reference character, said first means being responsive to a count signal and operative to provide a first address signal corresponding to the information stored in a selected one of said address storing locations and a reference signal corresponding to the information stored at the selected reference storing location;

second memory means including a second plurality of storage locations each storing a value of an unknown character at a discrete matrix location, said second plurality of storage locations being greater than said first plurality of storage locations, said second means being responsive to said first address signal and operative to provide a data signal corresponding to the value of the unknown character at the address location;

third means for producing said count signal;

fourth means for applying said count signal to said first means; and fifth means responsive to said data signal and said reference signal and being operative to provide an output signal when said signals are unlike, said output signal serving as an indication that said unknown character is not said reference character.

2. A character recognition apparatus as recited in claim 1 and further comprising multiplexer means coupled between said first and second memory means for selectively applying said first address signal to said second memory means.

3. A character recognition apparatus as recited in claim 1 wherein said first memory means comprises a read only memory and said second memory means comprises a random access memory.

4. A character recognition apparatus as recited in claim 1 wherein said fifth means comprises a comparator.

5. A character recognition apparatus as recited in claim 1 and further comprising sixth means for supplying a threshold signal and seventh means responsive to said output signal and said threshold signal and operative to produce a first signal when said unknown character is not said reference character.

6. A character recognition apparatus as recited in claim 5 wherein said first plurality of storage locations further includes a character storing location, said first memory means providing a character signal corresponding to the information stored in the selected character storing location, and eighth means responsive to said first signal and said character signal and operative to produce a second signal when said unknown character is determined.

7. A character recognition apparatus as recited in claim 1 wherein said first memory means includes a predetermined number of said first plurality of storage locations, each corresponding to a different reference character.

8. A character recognition apparatus as recited in claim 1 wherein said first memory means includes a predetermined number of said first plurality of storage locations, each corresponding to a reference character and a related preselected angular relationship relative to an index line.

9. A character recognition apparatus for recognizing an unknown character having a value at a matrix of discrete locations, said apparatus comprising:

first memory means having at least a first plurality of storage locations each containing an address storing location and a reference storing location and storing information relative to a reference character, said first means being responsive to a count signal and operative to provide a first address signal corresponding to the information stored in a selected one of said address storing locations and a first reference signal corresponding to the information stored at the selected reference storing location;

second memory means having at least a second plurality of storage locations each containing an address storing location and a reference storing location and storing information relative to a reference character, said second memory means being responsive to a count signal and operative to provide a second address signal corresponding to the information stored in a selected one of said address storing locations and a second reference signal corresponding to the information stored at the selected reference storing location;

third memory means including a third plurality of storage locations each storing a value of an unknown character at a discrete matrix location, said third plurality of storage locations being greater than said first and greater than said second plurality of storage locations, said third means being responsive to one of said first and said second address signals and operative to provide a data signal corresponding to the value of the unknown character at the address location;

fourth memory means including a fourth plurality of storage locations each storing a value of an unknown character at a discrete matrix location, said fourth plurality of storage locations being greater than said first and greater than said second plurality of storage locations, said fourth means being responsive to one of said first and second address signals and operative to provide a data signal corresponding to the value of the unknown character at the address location;

fifth means for producing said count signal;

sixth means for applying said count signal to said first and said second means;

seventh means for selectively applying said first and second address signals to said third and said fourth memory means;

eighth means responsive to said data signal and one of said first and second reference signals and being operative to provide an output signal when said signals are unlike, said output signal serving as an indication that said unknown character is not said reference character; and ninth means for selectively applying said first and second reference signals to said eighth means.

10. A character recognition apparatus as recited in claim 9 wherein said seventh means and said ninth means each comprise a multiplexer.

11. A character recognition apparatus as recited in claim 9 wherein said first and second memory means each comprise a read only memory.

12. A character recognition apparatus as recited in claim 9 wherein said third and fourth memory means each comprise a random access memory.

13. A character recognition apparatus as recited in claim 9 and further comprising 10th means for supplying a threshold signal and 11th means responsive to said output signal and said threshold signal and operative to produce a first signal when said unknown character is not said reference character.

14. A character recognition apparatus as recited in claim 13 wherein said second plurality of storage locations further include a character storing location, said second memory means providing a character signal corresponding to the information stored in the selected character storing location, and 12th means responsive to said first signal and said character signal and operative to produce a second signal when said unknown character is determined.

15. A character recognition apparatus as recited in claim 9 wherein said first and second memory means includes predetermined numbers of said first plurality of storage locations, each corresponding to a reference character and a preselected angular relationship relative to an index line, said first plurality of storage locations further including an end-of-character storing location, said first memory means providing an end-of-character signal corresponding to the information stored in the selected end-of-character storing location, and 13th means responsive to said output signal and said end-of-character signal and operative to produce a third signal indicative that a predetermined reference character is being investigated.

* * * * *